United States Patent [19]

Eckler

[11] Patent Number: 4,689,266

[45] Date of Patent: Aug. 25, 1987

[54] AIR DRYING PROTECTIVE COATINGS

[75] Inventor: Paul E. Eckler, Terre Haute, Ind.

[73] Assignee: International Minerals & Chemical Corp., Terre Haute, Ind.

[21] Appl. No.: 886,108

[22] Filed: Jul. 16, 1986

[51] Int. Cl.$^4$ .................. B32B 27/10; B32B 15/08; B32B 27/36

[52] U.S. Cl. .................. 428/334; 106/243; 428/480; 428/481

[58] Field of Search .............. 560/193, 199; 260/410.6, 410.7; 106/243; 428/220, 334, 480, 481

[56] References Cited

U.S. PATENT DOCUMENTS

| | | | |
|---|---|---|---|
| 2,689,799 | 9/1954 | Albus et al. | 106/181 |
| 2,800,500 | 7/1957 | Matuszak et al. | 560/199 |
| 3,088,928 | 5/1963 | Berres et al. | 560/199 |
| 4,122,057 | 10/1978 | Lamont et al. | 560/199 |
| 4,135,009 | 1/1979 | Mercurio | 106/180 |
| 4,151,001 | 4/1979 | Anderson et al. | 106/123.2 |
| 4,225,473 | 9/1980 | Heiberger | 525/7.1 |
| 4,282,124 | 8/1981 | McLaughlin | 106/263 |
| 4,311,624 | 1/1982 | Emmons et al. | 524/322 |

*Primary Examiner*—Theodore Morris
*Attorney, Agent, or Firm*—Robert H. Dewey; Thomas L. Farquer

[57] ABSTRACT

An ester represented by the formula $(A-B)_n\text{-}C\text{-}D_m$ where A is a branched-chain aliphatic alcohol, a cyclic alcohol or a glycol monoether thereof; B is an unsaturated dibasic acid or a substance which forms an unsaturated dibasic acid when heated; C is a polyol of at least 3 hydroxyl groups; D is an unsaturated fatty acid of from 18 to 22 carbon atoms; n and m are integers of 1 or more but n+m does not exceed the number of hydroxyls present in the C— compound.

15 Claims, No Drawings

AIR DRYING PROTECTIVE COATINGS

BACKGROUND OF THE INVENTION

This invention relates to improved air-drying protective coatings. In a particular aspect, this invention relates to improved air-drying alkyd enamels containing a reactive diluent.

Because of environmental and occupational hygiene concerns —as well as economics —there has been considerable effort in recent years to develop protective coatings without the use of the organic solvents which have conventionally been used in paints, varnishes, enamels, etc. Water-borne coatings, for example, have been very successful, but they have limited storage stability due to hydrolysis and performance properties are strongly affected by humidity.

One effort in recent years has been directed to replacing, at least in part, the inert, volatile solvents commonly used in alkyd resin formulations with a reactive solvent (or diluent) which reacts with the alkyd during the drying process and becomes a part of the final coating. For example, Emmons et al. in U.S. Pat. No. 4,311,624, disclosed the use of methacryloxyalkyl and/or acryloxyalkyl esters of drying oils along with dicyclopentenyloxyalkyl acrylates and methacrylates. Emmons et al. also review earlier efforts in this field.

Although the efforts of previous workers have apparently been technically successful, the disclosed reactive diluents have proven to be rather expensive and have not enjoyed wide-spread use. Therefore, there is a need for reactive diluents which are economically attractive as well as being technically useful.

Accordingly, it is an object of this invention to provide improved air-drying protective coatings.

It is another object of this invention to provide air-drying alkyd enamels containing a reactive diluent.

It is still another object of this invention to provide reactive diluent esters for use with air-drying alkyd enamels.

Still another object of this invention is to provide articles which have been coated with the improved alkyd enamel.

Other objects of this invention will be apparent to those skilled in the art from the disclosure herein.

SUMMARY OF THE INVENTION

It is the discovery of this invention to provide a reactive diluent ester which can be represented by the general structural formula $(A-B)_n-C-D_m$ where:

A is a branched chain aliphatic alcohol, a cyclic alcohol or a glycol ether thereof;
B is an unsaturated dibasic acid or a substance which forms an unsaturated dibasic acid when heated;
C is a polyol of at least three hydroxyl groups;
D is an unsaturated fatty acid of from 18 to 22 carbon atoms;

The letters n and m represent numbers of 1 or more and generally, but not necessarily, are integers of 1 to 8. However the quantity (n+m) should not exceed the number of hydroxyls present in the C-component. These letters refer, of course, to mole weight amounts of the components.

DETAILED DISCUSSION

The reactive diluent esters of the present invention can be prepared from a wide variety of materials by any suitable method, many of which are known, usually, but not necessarily, an esterification procedure. However the procedures will vary somewhat, as will be apparent from the examples, depending on the identity of raw materials of groups A,B,C and D.

The branched-chain aliphatic alcohols of Group A useful in the practice of this invention are iso- or secondary alcohols of from 3 to about 9 carbon atoms. The lower alcohols, e.g. of 3 or 4 carbon atoms, are quite volatile and may require special equipment to prevent losses. Preferred alcohols are those of 5 carbon atoms. Glycol ethers of these alcohols may also be used.

The cyclic alcohols or glycol ethers of Group A include but are not limited to phenol, cyclopentanol, menthol, cholesterol, phenoxyethanol and preferably, cyclohexanol; mixtures of alcohols, including mixtures with lower straight chain alkanols, e.g. $C_3$–$C_9$ alkanols, may also be used.

The glycol ethers of the Group A alcohols include but are not limited to lower alkyl (e.g. of from 1 to about 4 carbon atoms) monoethers of alkylene glycols, e.g. ethylene glycol, propylene glycol and butylene glycol. Methyl or ethyl ethers of ethylene glycol are preferred glycol ethers.

The unsaturated dibasic acids of Group B include but are not limited to maleic, fumaric, itaconic, aconitic, citraconic (including their anhydrides) or citric acids (citric acid is not a dibasic unsaturated acid, of course, but forms one when heated). Maleic anhydride is preferred. Mixtures of these acids or anhydrides may also be used.

The polyols of Group C include but are not limited to glycerol, pentaerythritol, dipentaerythritol, tripentaerythritol, higher pentaerythritols, trimethylolpropane, sorbitol, mannitol and, preferably, trimethylolethane, or mixtures thereof.

The unsaturated fatty acids useful in the practice of this invention include but are not limited to those of from 18 to 22 carbon atoms. The preferred acids are those obtained from drying oils such as tall oil, soybean oil, linseed oil, safflower oil, tung oil, and fish oil. Tall oil acids may also be used. The particularly preferred acid is linoleic. Mixtures of acids may also be used.

The formula $(A-B)_n-C-D_m$ represents the ideal stoichiometric proportions but it is understood that these proportions are not critical and can be varied considerably without departing from the concept of this invention. For example, all possible esters of groups B and D with groups A and C may be present and B-C can form a repeating unit. The molecular weight of the product (and hence the viscosity) depends on the amount of A present. Accordingly the amount of A may be varied, or, conversely, losses of A during the reaction must be controlled. In general, however, the proportion of Group A alcohols to Group B acids is in a mole ratio of about 0.9–1.1, but about 1 is preferred, (i.e., n=1).

The amount of Group C polyols used is determined by the respective amounts of Group A, B and D components, but in general, the amount of the polyol used is selected to provide an excess of about 10% hydroxy groups.

The amount of Group D component (the fatty acid) is generally in a mole ratio of about one-fourth to one of A+B. Preferably m=n.

As stated above, the reactive diluents of the present invention can be made by any known esterification procedure. When the group A compound is fairly volatile at reaction temperature, components A and B are mixed and heated to provide the ester of A. Then the polyol and the fatty acid are added along with an esterification catalyst, and heating is continued while removing water of reaction until an acid value of about 10 is reached. A solvent such as toluene may be employed, if desired. If the solvent forms an azeotrope with water, the water is removed by azeotropic distillation and the solvent is recycled. When the reaction is complete, the solvent is stripped and the product is cooled, ready for use. When component A is non-volatile, all components may be mixed and heated in one step. It is also within the concepts of this invention to employ a monobasic acid other than those of Group D to control the hydroxyl excess while varying n and m over a wider range. Useful acids include those which are stable at reaction temperature and which have boiling points high enough to prevent excessive loss from the kettle during the reaction. Typical acids include but are not limited to benzoic acid and p-t-butyl benzoic acid.

The amounts of the various components are selected in accordance with the general formula given above. The selection of these amounts is well within the ability of any person skilled in resin technology. For example, stoichiometric excess of hydroxyl components over acid components to increase the rate of reaction is common practice.

The alkyd resin used with the reactive diluent of the present invention may be any known alkyd resin previously used in solvent-based enamels and forms no part of this invention. The reactive diluent is used in known formulations to replace a part of the resin solids. The reactive diluent also reduces the viscosity so the solvent portion can be reduced to maintain the same viscosity at higher solids content. Typically the amount of solvent can be reduced by about 10-30%. Other components, such as pigments, driers, anti-skinning agents, etc. may be added as is known the art.

The present invention will be better understood by reference to the following examples. It is understood however that the examples are intended only to illustrate the invention and it is not intended that the invention be limited thereby.

EXAMPLE 1

Cyclohexanol 260 g (2.5980 moles) and maleic anhydride 255 (2.5980 moles) were combined and heated for 1 hour at 100° C. Then trimethylolethane (TME) 186 g (1.5147 moles), toluene 60 g and linoleic acid 369 g (1.2990 moles) (Pamolyn 200 marketed by Hercules Corp.) were added. Heating was continued at 220° C. with azeotropic distillation until an acid value of 10 was obtained. During this time 70 g of water was collected and in the final heating period, the toluene was stripped leaving a resin having a color of 4-5 Gardner and viscosity (Gardner) of Z-5+. The solids content was 99.5%, indicating some slight residual toluene.

In this example n=2 and m=1. The number of hydroxyls present in C is 3.

EXAMPLE 2

The experiment of Example 1 was repeated in all essential details except that the toluene was omitted. The amount of cyclohexanol used was 185.3 g (1.8503 moles); the amount of maleic anhydride was 181.4 g (1.8503 moles); the amount of trimethylolethane was 174 g (1.4179 moles) and the amount of linoleic acid was 525.5 g (1.8503 moles). After the first heating stage, p-toluene sulfonic acid 2 g was added as a catalyst. Water 66.7 g was separated. The resulting resin had a color of 7-8 and a viscosity of Z-1.

In this example n=1.5 and m=1.5. The number of hydroxyls present in C is 3.

EXAMPLE 3

The reactive diluent of Example 2 was used in the preparation of an air-drying alkyd resin enamel using the following formulation. For comparison, a similar enamel without the reactive diluent was also prepared. The alkyd resin employed was a commercial product solid as Cargill 5184 containing 50% non-volatile solids.

Each formulation was applied to a phosphatized steel panel (obtained from Parker-Rustproof Division of Oxy Metals Corp.) in an amount sufficient to form a 1.5 mil dry film. The properties of the dry coatings are given in the following table.

| Materials | | Without Reactive Diluent | With Reactive Diluent |
|---|---|---|---|
| Alkyd resin | | 425 lb | 340 lb |
| Diluent DA-78 | | 0 | 42 |
| Titanium dioxide | | 250 | 250 |
| Mineral spirits | | 168 | 91 |
| Disperse; then add | | | |
| Alkyd resin | | 200 | 160 |
| Diluent DA-78 | | 0 | 20 |
| Drier Premix | | | |
| 6% Co Naphthanate | 13.75 | | |
| 4% Ca Naphthenate | 20.62 | | |
| 18% Zirconium | 18.35 | | |
| Anti-skinning agent | 3.00 | | |
| Mineral spirits | 44.28 | | |
| | 100.00 | 19 | 19 |
| Mineral Spirits | | 100 | 100 |
| Properties | | | |
| Pounds/gal | | 8.68 | 9.04 |
| Viscosity, No. 2 Zahn cup, sec. | | 46 | 46 |
| Solids by weight, % | | 48.4 | 55.0 |
| Solids by volume, % | | 37.8 | 43.6 |
| Volatile organic compounds, lb/gal | | 4.48 | 4.07 |
| Stability, 120° F., weeks | | 2* | 2* |
| Drytime, hrs | | | |
| Set-to-touch | | 110 min | 110–140 min |
| 500 g Zapon | | 345 min | 345 min |
| Through-dry | | 24 hrs | 24 hrs |
| Properties** | | | |
| Gloss, 60° | | 89 | 91 |
| 20° | | 74 | 82 |
| Pencil hardness | | 3B | 3B |
| Reverse impact, in.-lb. | | 140–160 | 160 |
| Cross hatch adhesion | | 100 | 100 |

*Skinning
**1.5 mil dry film on phosphatized steel panels tested after 7 days

EXAMPLE 4

Preparation of Reactive Diluent DA-84

Isobutyl alcohol, 112.0 g (1.5070 moles) and maleic anhydride 148 g (1.5070 moles) were combined and heated for 1 hour at 100° C. Then TME 210(1.7071 moles), linoleic acid 428 g (1.5070 m), and benzoic acid 185 g (1.5070 m) were added along with 2 g toluene sulfonic acid as a catalyst and 50 ml toluene as a solvent. Heating was continued at 220° C. with removal of water by azeotropic distillation until an acid value of about 10 was obtained. Water, 81 g, was removed. The toluene was then stripped and the product was allowed to cool. In this example n=1 and m=1. The number of hydroxyls present in C is 3.

The product had a color of 4-5, and a viscosity of A (Gardner). It is useful for preparing an air-drying alkyd enamel of the type shown in Example 3. The air drying enamel is used as a coating on a steel panel.

EXAMPLE 5

Preparation of Reactive Diluent DA-87

The general procedure of Example 2 (i.e. without toluene solvent) was followed using the following ingredients:

| Cyclohexanol | 118 g | 1.1743 moles |
|---|---|---|
| Maleic anhydride | 115 | 1.1743 |
| TME | 164 | 1.3308 |
| Linoleic | 667 | 2.3486 |
| Toluene sulfonic acid | 2 | |

During the heating period, 63 g of water was recovered. In this example $n=1$ and $m=2$. The number of hydroxyls present in C is 3.

The resulting product had a color of 7-8 and the viscosity was U-½ (Gardner). The product is useful for preparing an air-drying alkyd enamel of the type shown in Example 3. The enamel is used as a coating on a steel panel.

EXAMPLE 6

Preparation of Reactive Diluent DA-88

Following the general procedure of Example 2, reactive diluent DA-88 was prepared using the following ingredients:

| Cyclohexanol | 129 g | 1.2908 moles |
|---|---|---|
| Maleic anhydride | 127 | 1.2908 |
| TME | 180 | 1.4634 |
| Heptanoic acid | 84 | 0.6454 |
| Linoleic acid | 550 | 1.9362 |
| Toluene sulfonic acid | 2 | |

During the final heating period, 70 g of water was recovered. The product had a color of 7-8 and the viscosity was T-U. Non-volatile matter was 96.24% of the type shown in Example 3. The enamel is used to coat a steel panel. The product is useful for preparing an air-drying alkyd enamel. In this example $n=1$ and $m=1.5$. The number of hydroxyls present in C is 3.

EXAMPLE 7

Preparation of Reactive Diluent DA-89

Following the general procedure of Example 2, reactive diluent DA-89 was prepared from the following ingredients:

| Cyclohexanol | 127 g | 1.2665 moles |
|---|---|---|
| Maleic anhydride | 124 | 1.2665 |
| TME | 177 | 1.4352 |
| Pelargonic acid | 101 | 0.6333 |
| Linoleic acid | 540 | 1.8998 |
| Toluene sulfonic acid | 2 | |

During the final heating period, 68 g of water was recovered. The product had a hydroxyl content of 0.86% (9.98% excess). The color was 7-8; the viscosity was V-. Non-volatile matter was 95.3%. The product is useful for preparing an air-drying alkyd enamel of the type shown in Example 3. The enamel is used as a coating on wooden article.

In this example $n=1$ and $m=1.5$. The number of hydroxyls present in C is 3.

EXAMPLE 8

Phenoxyethanol 2.6 moles, fumaric acid 2.6 moles sorbitol 0.76 moles and fish oil acids 1.3 moles are charged to a reaction vessel. Toluene is added as a solvent. The mixture is heated at a temperature within the range of 125°–150° C. while removing water of reaction by azeotropic distillation until an acid value of 10 is reached for the reaction mixture. The toluene is then removed by distillation and the reaction mixture is allowed to cool. The reactive diluent thereby obtained is useful in air drying alkyd enamels.

EXAMPLE 9

The experiment of Example 8 is repeated in all essential details except that cyclopentanol, itaconic acid, sorbitol and safflower oil acids are substituted in equivalent weight amounts for phenoxyethanol, fumaric acid, sorbitol and fish oils, respectively. The product is useful as a reactive diluent in air-drying alkyd enamels.

EXAMPLE 10

The experiment of Example 8 is repeated in all essential details except that equivalent weight amounts of phenol, aconitic acid, glycerol and tall oil fatty acids are substituted for the phenoxyethanol, fumaric acid, sorbitol and fish oil acids respectively. The product is useful as a reactive diluent in air-drying enamels.

EXAMPLE 11

The experiment of Example 8 is repeated in all essential details except that equivalent weight amounts of menthol, citraconic acid, pentaerythritol and tung oil acids are substituted for phenoxyethanol, fumaric acid, sorbitol and fish oil acids respectively. The product is useful as a reactive diluent in air-drying enamels.

EXAMPLE 12

The experiment of Example 8 is repeated in all essential details except that equivalent weight amounts of cholesterol, citric acid, dipentaerythritol and soybean oil acids are substituted for phenoxyethanol, fumaric acid, sorbitol and fish oil acids respectively. The product is useful as a reactive diluent in air-drying alkyd enamels.

I claim:

1. An ester represented by the formula $(A-B)_n-C-D_m$ where A is a branched-chain aliphatic alcohol of from 3 to about 9 carbon atoms or glycol ethers thereof, a cyclic alcohol or a glycol monoether thereof selected from the group consisting of phenol, cyclopentanol, menthol, cholesterol, phenoxyethanol and cyclohexanol including mixtures thereof and including mixtures thereof with straight chain alkanols of from three to nine carbon atoms, said glycol monoether being that of a glycol having from 1 to 4 carbon atoms; B is an unsaturated dibasic acid or a substance which forms an unsaturated dibasic acid when heated selected from the group consisting of maleic, fumaric, itaconic, aconitic, citraconic and anhydrides thereof and citric acid and mixtures thereof; C is a polyol of at least 3 hydroxyl groups selected from the group consisting of glycerol, pentaerythritol, dipentaerythritol, tripentaerythritol, higher pentaerythritols, trimethylolpropane, sorbitol, mannitol and trimethylolethane or mixtures thereof; D is an unsaturated fatty acid of from 18 to 22 carbon atoms selected from the group consisting of acids obtained from tall oil, soybean, linseed oil, safflower oil, tung oil and fish oil; n and m are numbers of 1 or more but n+m does not exceed the number of hydroxyls present in the C-compound.

2. The ester of claim 1 wherein A is phenol, phenoxyethanol, cyclopentanol, cyclohexanol, menthol or cholesterol.

3. The ester of claim 1 wherein A is a branched chain aliphatic alcohol of 3 to 5 carbon atoms.

4. The ester of claim 3 wherein A is isobutyl alcohol or isoamyl alcohol.

5. The ester of claim 1 wherein A is a monoalkyl ether of an alkylene glycol, the alkyl group being of from 1 to 4 carbon atoms and the alkylene group being of from 2 to 4 carbon atoms.

6. The ester of claim 1 wherein A is cyclohexanol, B is maleic anhydride, C is trimethylolethane, and D is linoleic acid.

7. The ester of claim 1 wherein C is glycerol, pentaerythritol, dipentaerythritol, tripentaerythritol, higher pentaerythritols, trimethylolethane, trimethylopropane, sorbitol or mannitol.

8. The ester of claim 7 wherein C is trimethylolethane.

9. The ester of claim 1 wherein D is supplied by tall oil fatty acids, soybean oil fatty acids, linseed oil fatty acids, safflower oil fatty acids or fish oil fatty acids.

10. The ester of claim 1 wherein D is an unsaturated fatty acid of from 16 to 22 carbon atoms or mixture thereof.

11. The ester of claim 1 wherein B is maleic, fumaric, itaconic, aconitic, citrocomic or citric or an anhydride thereof or mixtures thereof.

12. An air drying alkyd resin enamel consisting essentially of an alkyd resin and an ester of claim 1.

13. An article coated with about 0.1–5 mil thick layer of enamel of claim 12.

14. The article of claim 13 wherein the article is steel.

15. The article of claim 13 wherein the article is of wood.

* * * * *

UNITED STATES PATENT AND TRADEMARK OFFICE
CERTIFICATE OF CORRECTION

PATENT NO. : 4,689,266
DATED : August 25, 1987
INVENTOR(S) : Paul E. Eckler

It is certified that error appears in the above-identified patent and that said Letters Patent are hereby corrected as shown below:

Column 4, line 12, "solid" should read -- sold --

Column 4, line 30, "Naphthenate" should read -- Naphthanate --

Column 8, Claim 11, line 2, "citrocomic" should read -- citraconic --

Signed and Sealed this

Fourteenth Day of June, 1988

Attest:

DONALD J. QUIGG

*Attesting Officer*  *Commissioner of Patents and Trademarks*